O. H. KING.
BELT CONCENTRATING OR VANNING MACHINE FOR SEPARATING PULVERIZED ORES AND SIMILAR MATERIAL.
APPLICATION FILED JUNE 20, 1910.
1,108,186.
Patented Aug. 25, 1914.
4 SHEETS—SHEET 1.
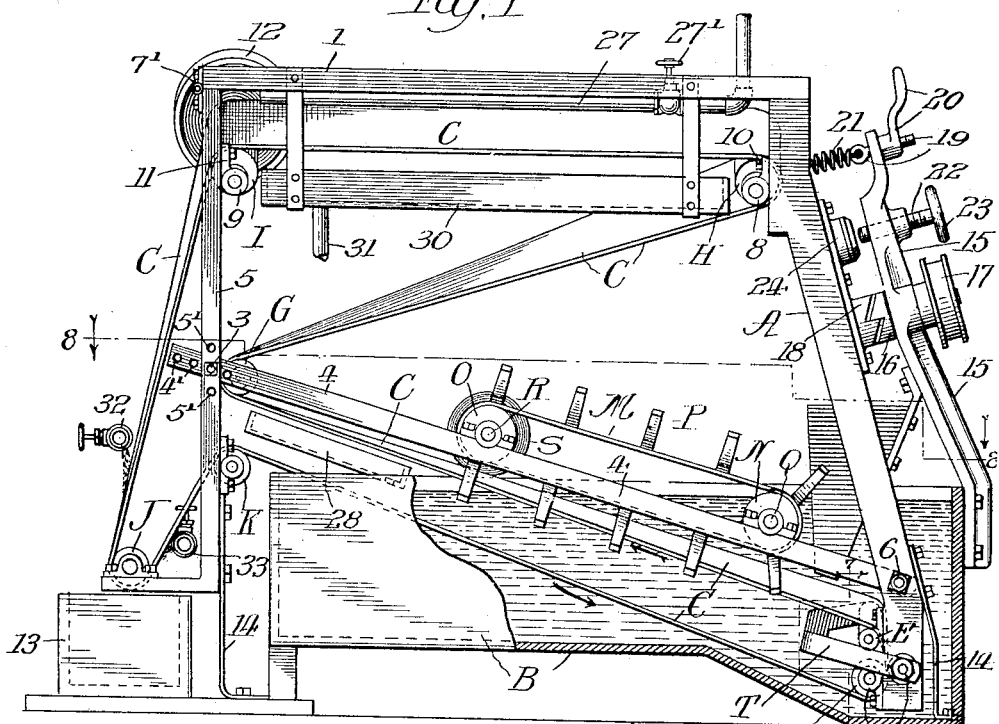

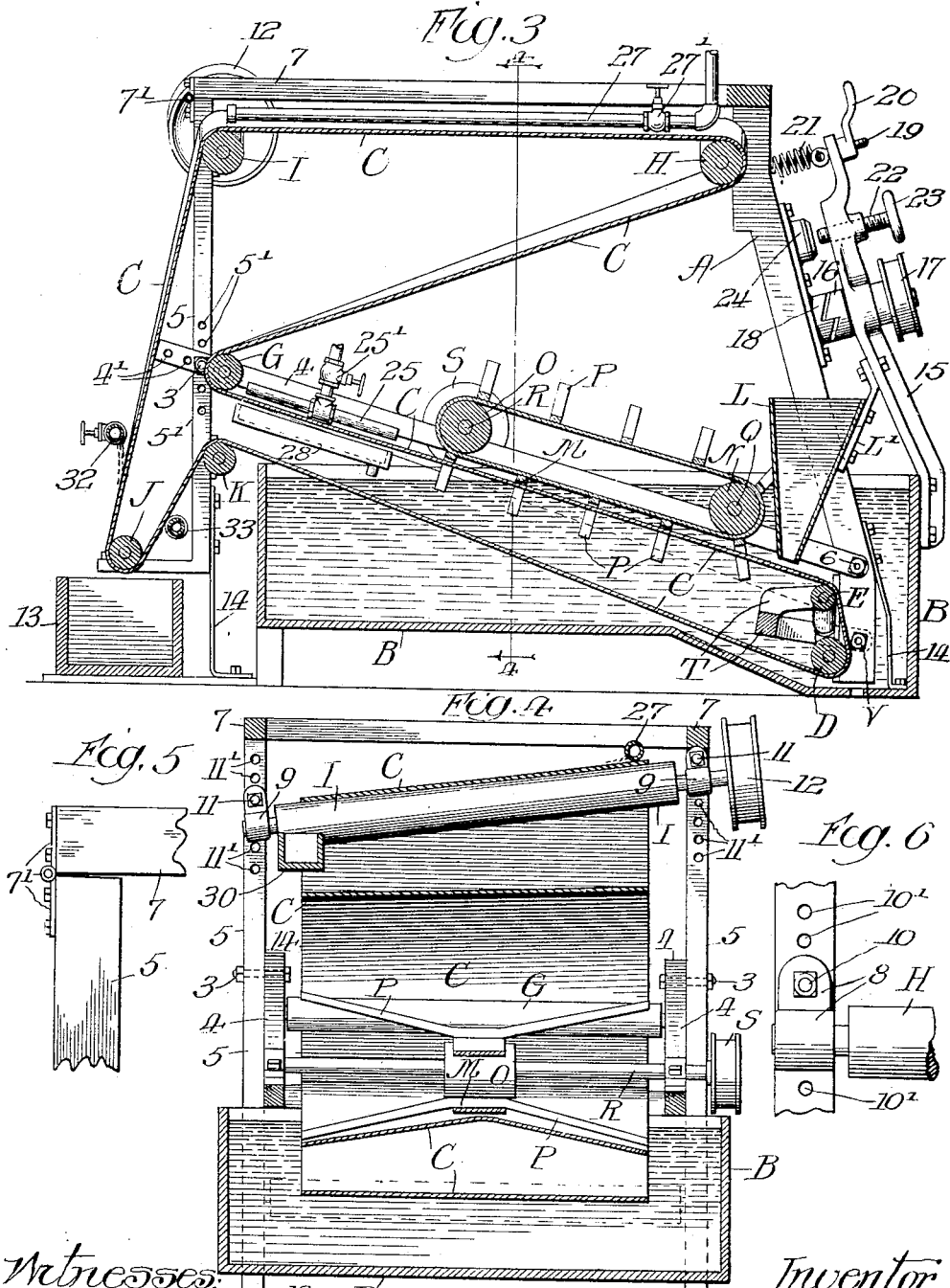

O. H. KING.
BELT CONCENTRATING OR VANNING MACHINE FOR SEPARATING PULVERIZED ORES
AND SIMILAR MATERIAL.
APPLICATION FILED JUNE 20, 1910.
1,108,186.  Patented Aug. 25, 1914.
4 SHEETS—SHEET 3.
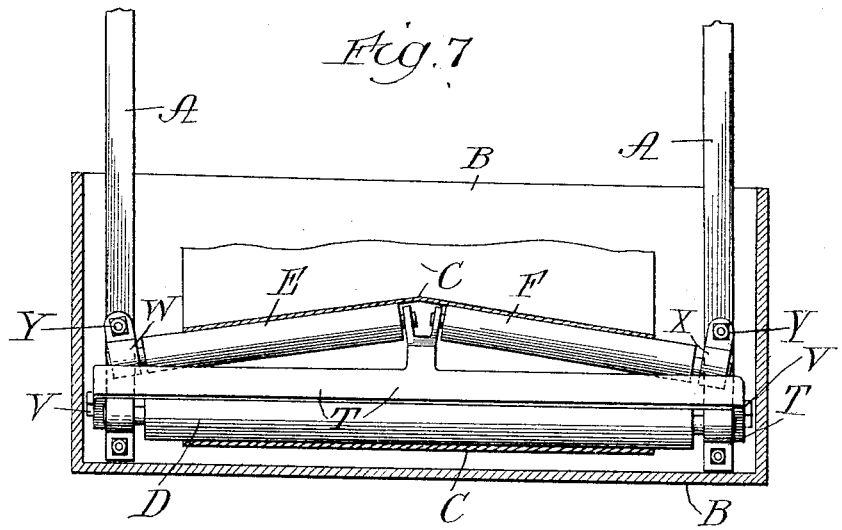
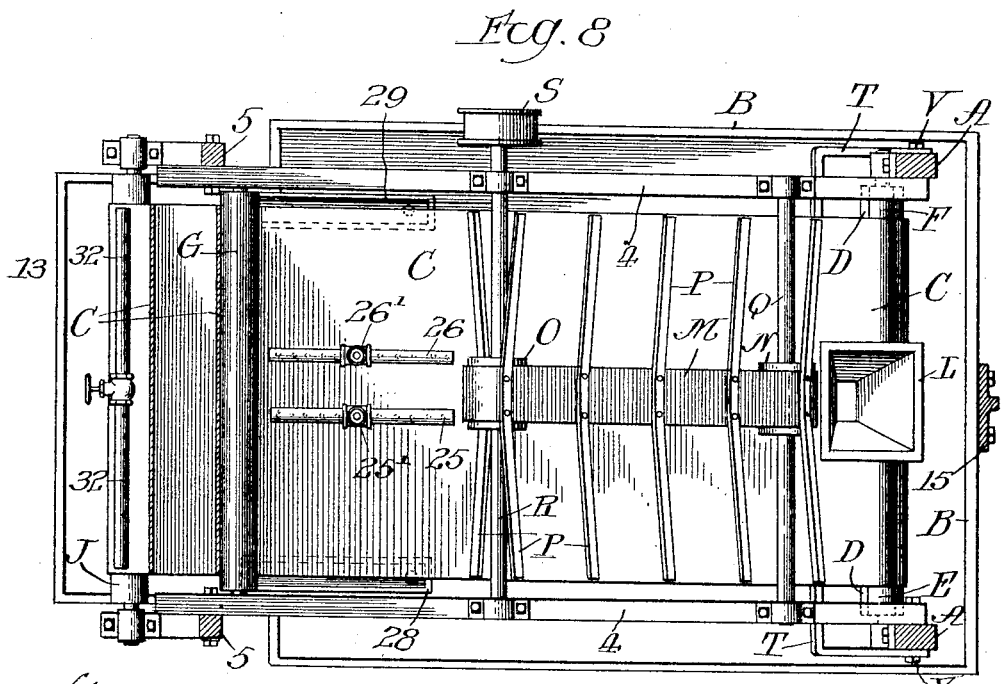

O. H. KING.
BELT CONCENTRATING OR VANNING MACHINE FOR SEPARATING PULVERIZED ORES AND SIMILAR MATERIAL.
APPLICATION FILED JUNE 20, 1910.

1,108,186.

Patented Aug. 25, 1914.

4 SHEETS—SHEET 4.

Witnesses:
Harold G. Barrett.

Inventor
Orrin H. King.
By Heidman & Street
attys.

UNITED STATES PATENT OFFICE.

ORRIN H. KING, OF CHICAGO, ILLINOIS, ASSIGNOR TO UNITED STATES CONCENTRATING COMPANY, A CORPORATION OF ILLINOIS.

BELT CONCENTRATING OR VANNING MACHINE FOR SEPARATING PULVERIZED ORES AND SIMILAR MATERIAL.

1,108,186.  Specification of Letters Patent.  Patented Aug. 25, 1914.

Application filed June 20, 1910. Serial No. 567,817.

*To all whom it may concern:*

Be it known that I, ORRIN H. KING, a citizen of the United States, residing at 1720 Chicago avenue, Chicago, Cook county, Illinois, have invented certain new and useful Improvements in Belt Concentrating or Vanning Machines for Separation of Pulverized Ores and Similar Material, of which the following is a specification.

The object of my invention is mainly to devise and construct a concentrating or vanning machine, in which concentrating and separating effect is had on a traveling belt or equivalent device under water, as well as above the surface of the water, and my invention consists in the features and details of construction and the association and combination of parts hereinafter described and claimed.

Figure 9:
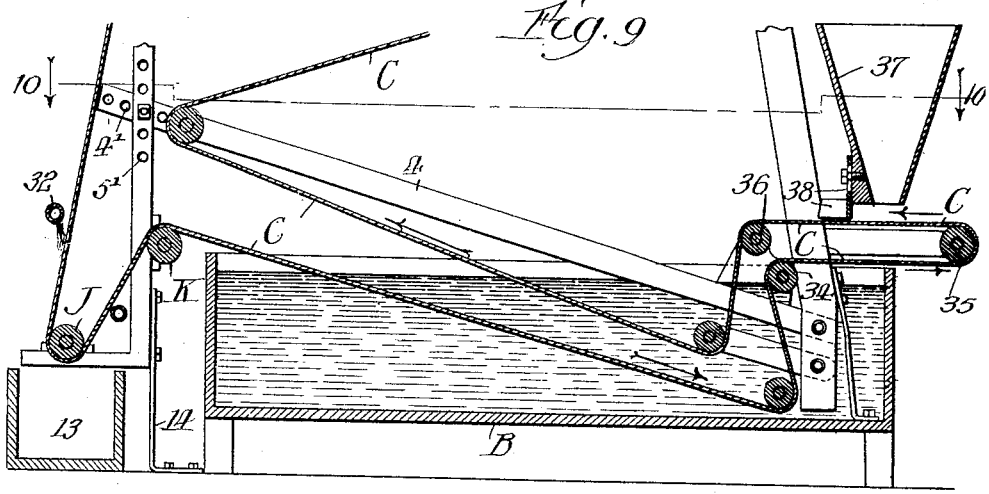
Figure 10:
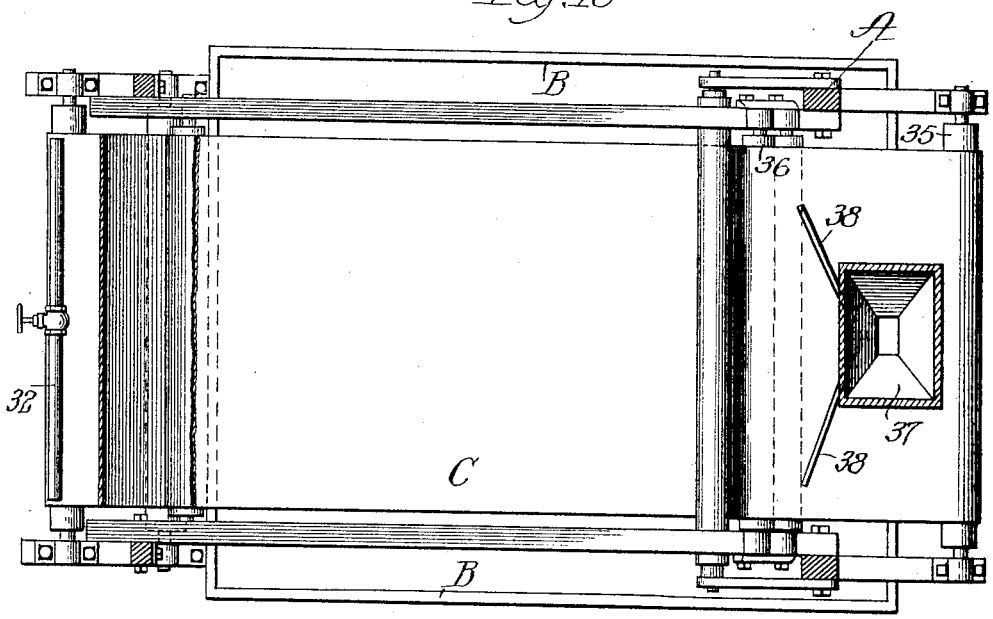

In the drawings Figure 1 is principally a side elevation of my concentrating machine, but, however, with a portion of the side of the water tank through which the concentrating belt in part travels, broken away and removed. Fig. 2 is a top plan of my concentrating machine. Fig. 3 is a longitudinal, vertical section of my machine on line 3—3 of Fig. 2, looking in the direction of the arrows. Fig. 4 is a transverse vertical section of my machine on line 4—4 of Fig. 3, looking in the direction of the arrows. Fig. 5 is an enlarged fragmentary detail of the upper left hand corner of Fig. 3 showing the hinged connection at this point of frame timbers. Fig. 6 is an enlarged fragmentary detail of one of the upper roller journal boxes, it being secured to the frame only at its upper side. Fig. 7 is an enlarged transverse detail of a part of my concentrating machine on line 7—7 of Fig. 1, looking in the direction of the arrows. Fig. 8 is a transverse longitudinal section of my machine on line 8—8 of Fig. 1, looking in the direction of the arrows. Fig. 9 is a central vertical longitudinal section of the lower part of a somewhat modified form of my concentrating machine. Fig. 10 is a transverse longitudinal plan and section of the modification shown in Fig. 9, on line 10—10 of Fig. 9, looking in the direction of the arrows.

In making my improved concentrating machine, I provide a suitable general supporting frame A, of wood and metal of sufficient size and strength, and adapted to support the several parts attached to or assembled on it, and to otherwise subserve the purposes for which it is intended. To operate in conjunction with said frame and other parts of my concentrating machine, I provide a suitable water tank or receptacle B, and preferably locate one portion of the supporting frame with some parts which it carries, as hereinafter described, in the tank, as especially shown in Figs. 1 and 3.

At suitable points on the supporting frame, to guide and carry a concentrating belt C, I locate rollers, D, E, F, G, H, I, J and K, respectively. The concentrating belt may be of canvas, rubber or any other suitable material, adapted to travel over the several rollers as shown, and afford a suitable surface on which to effect concentration.

The rollers D, E and F are located within the water tank below the water line, as most clearly shown in Fig. 7, and the roller G is located somewhat above the water tank in position, as best shown in Figs. 1 and 3, so the concentrating belt will travel a desired distance under the water in the tank and also a desired distance after running or being traveled out of the water.

I assume the initial place in the cycle of travel of the belt to be at the rollers E and F, and to operate in conjunction with the belt adjacent to this place I provide a hopper L, which I have suitably supported to the tank B by a part $L^1$, or other suitable device, adapted to receive material to be concentrated, in a plastic state of comparatively thick mud or paste, and to deliver the same on the belt at the desired point, which in this instance is under the water near the rollers E and F, from whence, as the belt travels in the direction indicated by the arrows, such material is carried along some distance under the water before reaching the surface and emerging from the water.

Extending from near the hopper along to operate close to the concentrating surface of the belt for a desired distance, I provide a spreader or distributer, which comprises an appropriate comparatively small belt M, passing over the rolls N and O, carrying deflecting scrapers P, of form to operate close to the surface of the concentrating belt, and to spread, distribute and deflect outward the pulverized materials deposited on the concentrating belt by the hopper, as such material is carried along under the distributers by the travel of the concentrating belt.

The rollers N and O are supported and rotated by the shafts Q and R respectively, suitably journaled, as especially shown in Fig. 4,—the latter of which shafts carries a belt drive pulley S, for receiving rotary motion from any suitable source of power supply. The travel of the scrapers as they are carried along by their supporting belt M, may be in either direction relative to the concentrating belt, as will best facilitate spreading of the pulp.

The rollers E and F are shorter than the other rollers, reaching from the sides of the machine to near its center, and are journaled at their central ends on a yoke T, as especially shown in Fig. 7, which yoke is adjustably supported at its outer ends by bolts U and V, passing through the general frame structure. After loosening the bolts U and V, the yoke may be swung or moved up or down to adjust the inner ends of the rollers E and F to a higher or lower position with relation to their outer ends, and thereby increase or decrease, as desired, the crown angle condition of the part of the concentrating belt, between these rollers and the roller G.

The journal boxes W and X, which support the outer ends of the rollers E and F, are held at their upper sides by single bolts Y and Z, as especially shown in Fig. 7, and are adapted to swing, as may be necessary to maintain proper alinement with the journal spindles of the rollers E and F as the inner end of the latter are adjusted up or down by the yoke T, as above described.

To change or adjust the inclination of the upwardly traveling portion of the concentrating belt operating between the rollers E and F and the roller G, the bolts 3 may be removed, which secure the parts 4 of the frame to the parts 5, and the parts 4 may be raised or lowered so that the bolt holes in the parts 4 will register with the desired holes 5' located in a higher or lower position in parts 5, when the bolts may be replaced, thereby securing these parts rigidly together after having accomplished the adjustment and purpose just explained, the roller G being carried and supported by the parts 4. The parts 4, at their opposite ends are secured to the other parts of the general frame structure by bolts 6, in a manner to permit of movement for the said adjustment.

The part 5, of the general frame at its upper end is hinged to the part 7 through suitable hinges 7', and when it is desired to tighten or increase the tension of the concentrating belt, the said bolts 3 may be removed as just above explained, and the parts 5 drawn backward in position so that a desired one of the holes 4' will register with a suitable hole 5' in the part 5 when the bolts may again be replaced. The concentrating belt after passing over around the rollers E and F, travels as before explained in the direction indicated by the arrows, under the feed hopper and under the spreader and around the roller G, then over the rollers H and I, which two latter rolls are preferably somewhat elevated as shown, and are a sufficient distance apart to afford a desired length of belt between which to effect further separation. The part of the concentrating belt located between these rolls H and I, should have a side inclination as illustrated, and to effect this, the rollers H and I are provided with journal boxes 8 and 9 respectively of the character more clearly shown in Fig. 4, and detail Fig. 6, adapted to be secured to the frame work by single bolts 10 and 11, located at their upper ends, so as to enable them to swing to maintain alinement with the rollers as one or the other end of each of said rollers is moved up or down by moving that box in a higher or lower position, its bolt being placed in a higher or lower one of the respective holes 10' or 11' in the supporting frame. It will therefore be seen as illustrated most clearly in Fig. 4, that the rollers H and I may be set at an inclination, and that the part of the concentrating belt passing over and between them will also have a proportionate sidewise inclination or slant.

In order to rotate the roller I, by which the concentrating belt is driven, I provide a belt pulley 12 on the extended end of the shaft of the roller I, to which rotation may be imparted from any suitable source of power supply. After the concentrating belt in its travel has passed over the roller I, it then passes downward over the roller J, which is preferably located in position above a suitable concentrate receiving tank or receptacle 13, and thence travels up over the roller K, thence in a downwardly inclined course into the water tank B, to a submerged state, and under the roller D, and to and over the adjustable rollers E and F, again reaching the initial point in its cycle of operation, at the feed hopper L.

The general supporting frame is preferably carried or supported by yieldable supports 14, of spring metal or suitable equivalent material, as illustrated and is readily susceptible to limited longitudinal movement or swing, carrying with it the several rollers, their supporting journals and the concentrating belt.

In order to impart vibration or quick longitudinal movement or jar to the belt, I provide a rigid support 15, which in this instance I have illustrated as an adequate casting 15, secured to the end of the water box B, which casting extends upward a desired distance along the front end of the frame of the concentrating machine, and on this casting I have provided a rotatable jaw or cam part 16 adapted to be revolved by the pulley 17, which may be driven from any suitable source of power. To operate in conjunction with this cam part 16, I provide, secured to the general frame, a corresponding cam part 18, so that as the part 16 revolves in the right direction, the part 18 will be pushed or deflected from the part 16, rocking the general frame and its parts, on the flexible spring supports 14. To insure a sufficiently quick returned position of the general frame, after being deflected or pushed by the cams I provide on the extended end of the casting 15, a screw threaded eye bolt 19, having a tail nut 20, and on its opposite end engaging a suitable spring 21 which is attached to the frame as illustrated in Figs. 1 and 3. The spring 21 at its opposite end is attached to the general frame, and is of sufficient strength to quickly pull back the frame after it has been deflected by the cam parts, and the tension and force with which such backward movement is effected may be regulated by use of the tail nut 20, tightening or loosening the tension of the spring 21.

To limit the extent of return movement of the frame, which in a large measure governs the severity of the shock and resultant vibration with which such return movement is interrupted, I provide a substantial externally screw threaded rod 22, passing through a correspondingly screw threaded hole in the casting 15, and on the outer end of this rod, adapted to turn the same when desired, I mount a suitable hand wheel 23, and in position to contact with the other end of the screw rod 22, secured to the general frame, I provide a buffer 24, so that these two parts when they contact will quickly stop the backward movement of the frame and produce a shock or jar to assist in effecting separation of the material under treatment. To further assist in separating the waste material from the values, or in effecting concentration, I provide water spray pipes 25, 26 and 27 respectively, in position to supply water as desired, to wash and pass over the desired portions of the surface of the concentrating belt, and to collect the tailings or residues washed from the belt by these spray pipes, I provide troughs suitably located for that purpose, as hereinafter explained. The spray or water pipes are provided with valves 25', 26' and 27' respectively, by which the pressure and volume of the spray are regulated as desired.

Assuming the zone of the concentrating belt in proximity to the hopper, to be the starting or initial point, in the cycle of its travel, as above explained; in operation, the hopper deposits material for separation at this place, under water or in a submerged state, in preferably a rather thick or heavy paste condition. The pasty material so deposited will then be carried along by the travel of the belt in an upwardly inclined course under the distributing scrapers P, where it will be smoothed and thinly spread outward toward the edges of the belt. At the same time the pulley 17 is revolved, causing rotation of the cam part 16, which subjects the general frame, with the concentrating belt and material for separation on the belt to a vibrating and jarring motion, which motion, together with the action of the distributing scrapers, and the action of the wash and wave movement of the water, both above and below the liquid surface, created by the vibration, will cause the material to be separated, especially as it is being carried up out of the water. The concentrating belt within this zone is in a crowning condition, inclined from its center both ways toward its edge, as has been herein explained, so that the waste or worthless parts of the material, which are known as tailings, will be largely separated and here washed off over the edges of the belt, and the heavier or mineral particles will adhere closely to the surface of the belt and be carried on with the belt in its travel to a position out of the water within the influence of the spray water delivered from the spray pipes 25 and 26, where further separation may be effected. The tailings separated here pass into the respective boxes 28 and 29, suitably located to receive them, the concentrates or heavier materials, still adhere to the concentrating belt and pass on up with the belt in its onward travel around the roller G, and over the roller H, thence over the roller I.

Between the rollers H and I, the belt assumes a sidewise slant as hereinabove explained, and operates under the influence of the water delivered from the spray pipe 27, where final cleansing and more complete separation is effected, the removed tailings and middlings, or either as the case may be, being collected as they are delivered from the side of the belt at this point, by the launder trough 30, and from there flow to a desired place through the discharge pipe 31, (Fig. 1). After the belt laden with its minerals passes over the roller I, it travels downward under the roller J, thence over the roller K, and in such travel comes within the range of action of the spray pipes 32 and 33 respectively, which deliver water with sufficient force and impact to clean the adhered concentrates from the belt, diverting them into the box 13, or other suitable receptacle, after which the belt is cleaned, ready to pass down under the roller D and up over the rollers E and F, to again be loaded with material from the hopper L.

In Figs. 9 and 10 I have illustrated somewhat of a modification of my concentrator, in which the material for separation is deposited on the concentrating belt at a point above the submerged part of said belt, and before entering the submerged zone, said material is smoothed or leveled as desired on the said belt. In Fig. 9, as will be seen, I have provided rollers 34, 35 and 36 respectively, in positions to carry the concentrating belt under the feed hopper 37, which hopper has a smoothing or deflecting wing 38 attached thereto, suitable to spread or smooth to a desired state, the material for separation after it has been deposited from the hopper, the travel of the belt being in a direction indicated by the arrows, which brings the deposited material under the influence of the distributing wings, before the belt reaches a point of submergence. In this modification it will be seen that there is initially the plane or area submerged on which to deposit the material and smooth or distribute it to a proper state, thence the material is carried, with the travel of the belt, to a submerged position where it is subjected to treatment in a submerged state, as hereinabove described, with reference to the main figures of the drawing; the intention being to use this modification in substantial conjunction with the first described features of my main invention.

What I regard as new and desire to secure by Letters Patent is:

1. An ore concentrating or vanning machine, comprising a liquid containing receptacle, an endless movable member arranged to travel through said receptacle and be submerged during a part of its travel, frame members provided with rollers at their lower ends about which said endless member travels, the lower ends of said frame members being yieldingly mounted, means whereby said frame members are vibrated and vibrations imparted to the endless member, means for depositing material on said endless member, mechanism arranged adjacent to the point of deposit of said material whereby the material is spread across the surface of the endless member, means whereby the material laden endless member may be washed or sprayed at points in its travel after leaving the liquid containing receptacle, and a series of receptacles arranged in proximity to said last mentioned means.

2. An ore concentrating or vanning machine comprising a liquid containing receptacle, an endless member arranged to travel through said receptacle and be submerged during a part of its travel, frame members yieldingly mounted at their lower ends and provided with rollers at their lower ends, means whereby said frame members will be given vibrations and the same imparted to the endless member, means whereby the rollers at the lower ends of said frame members are adjustably held at an incline transversely to the endless member, means whereby the endless member may be given a varying inclination at the submerged point of its travel, means whereby material is deposited on said endless member, and mechanism for spreading said material transversely across said endless member.

3. An ore concentrating or vanning machine comprising a liquid containing receptacle, an endless member arranged to travel through said liquid containing receptacle, frame members yieldingly mounted and provided with rollers at their lower ends about which the endless member travels, means whereby the frame members are vibrated and vibrations imparted to the endless member, means whereby said rollers are adjustably held and the endless member given a varying transverse crowning inclination, means whereby the endless member is given the desired degree of inclination longitudinally, a hopper for depositing material on said endless member, and means whereby the endless member is sprayed or washed at points beyond its submergence.

4. An ore concentrating or vanning machine comprising a liquid containing receptacle, an endless member arranged to travel through said receptacle, frame members yieldingly mounted at their lower ends, means whereby said frame members may be vibrated, a set of rollers adjustably secured to the lower ends of said frame members, a yoke arranged to provide bearings for one end of a portion of said rollers whereby said rollers may be given varying degrees of inclination transversely of the endless member, a hopper for depositing the material on said endless member, and means whereby the material will be spread across said endless member.

5. An ore concentrating or vanning machine comprising a liquid containing receptacle, an endless member a portion of whose travel extends through said receptacle, frame members yieldingly mounted and provided with rollers at their lower ends, means whereby said frame members will be given vibrations, means adjustably mounted to the frame members and providing bearings for adjacent ends of said rollers whereby the latter may be given varying degrees of inclination transversely of the endless member, means whereby the endless member may be given varying degrees of inclination longitudinally, means for depositing material on said endless member, and means arranged along the path of said endless member whereby the latter may be washed or sprayed.

6. An ore concentrating or vanning machine comprising a liquid containing receptacle, an endless member arranged to travel through said receptacle, frame members yieldingly mounted at their lower ends and provided with rollers, means adjustably secured to the lower ends of said frame members and arranged to provide bearings for the adjacent ends of a portion of said rollers whereby the rollers may be given varying degrees of inclination transversely of the endless member, means whereby the frame members may be given vibrations and the same imparted to the endless member, means for depositing material on said endless member, and means for spraying or washing said endless member at different points in its travel.

7. An ore concentrating or vanning machine comprising a liquid containing receptacle, an endless member arranged to travel through said receptacle, yieldingly mounted frame members provided with rollers about which the endless member travels, means whereby the lower ends of said frame members may be adjusted in a direction longitudinally of the endless member, means secured to the lower ends of said frame members and providing bearings for some of the rollers whereby the latter may be given varying degrees of inclination transversely of the endless member, means whereby the frame members are given vibrations, a hopper for depositing material on said endless member, means whereby the material will be spread across said endless member, and means arranged along the path of said endless member whereby the latter may be washed or sprayed.

8. An ore concentrating or vanning machine comprising a liquid containing receptacle, an endless member arranged to travel through said receptacle and be submerged during a part of its travel, a pair of frame members whose lower ends are yieldingly mounted in said receptacle, rollers mounted at the lower ends of said frame members about which the endless member travels, means adjustably secured to the lower ends of said frame members and arranged to control the adjacent ends of two of said rollers whereby the endless member is given a transverse crowning inclination, means whereby the endless member is adjustably inclined longitudinally, means whereby said pair of members is vibrated, a hopper for depositing material on said endless member, and means arranged along the path of said endless member whereby the latter is sprayed or washed at points beyond the point of submergence.

9. In an ore concentrating or vanning machine, the combination of a travelable concentrating member adapted to receive pulverized material for concentrating, means for depositing such material on said member, means for traveling and deflecting said member through a state of liquid submergence, and again out of such state of submergence, means for subjecting said member to vibration, means for adjusting the crowning inclination of said member throughout one part of its travel, means for adjusting the sidewise inclination of said member throughout another of its travel, means for adjusting the ascending inclination of said member within a portion of its course of travel, and means for subjecting said member to the spraying action of liquid, substantially as described.

ORRIN H. KING.

Witnesses:
NORMAN A. STREET,
E. N. KERNWEIN.